US006226609B1

(12) United States Patent
Imade

(10) Patent No.: US 6,226,609 B1
(45) **Date of Patent: *May 1, 2001**

(54) CODE IMAGE RECORDING APPARATUS HAVING A MICROPHONE, A LOUDSPEAKER AND A PRINTER

(75) Inventor: Shinichi Imade, Iruma (JP)

(73) Assignee: Olympus Optical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/164,719

(22) Filed: Oct. 1, 1998

(30) Foreign Application Priority Data

Oct. 9, 1997 (JP) .................................................. 9-277420

(51) Int. Cl.[7] ............................ G01L 15/26; G01L 21/06

(52) U.S. Cl. ........................................... 704/235; 704/270

(58) Field of Search .................................... 704/235, 276, 704/260, 270

(56) References Cited

U.S. PATENT DOCUMENTS 5,923,624 * 7/1999 Groeger et al. .......................... 369/7
6,009,393 * 12/1999 Sasaki ................................. 704/258
6,043,899 * 3/2000 Morohashi et al. ................ 358/1.18

FOREIGN PATENT DOCUMENTS 0 670 555 A1 9/1995 (EP) .

* cited by examiner

*Primary Examiner*—Richemond Dorvil
*Assistant Examiner*—Angela A. Armstrong
(74) *Attorney, Agent, or Firm*—Frishauf, Holtz, Goodman, Langer & Chick, P.C.

(57) ABSTRACT

A receivable input data computing section drives a subtraction performing section to determine the difference between the accumulated number of compressed and encoded frames that has been counted by the number of accumulated audio frames counting section and the preset volume of receivable input data. The receivable input data computing section then normalizes the obtained difference to make it conform to the display format of the volume of the data volume display section. The data volume display drive section turns on each of five LEDs when a speech input operation is started and turns off the leftmost active LED each time data have been input by a volume corresponding to a ⅕ of the receivable data volume.

5 Claims, 4 Drawing Sheets

CODE IMAGE RECORDING APPARATUS HAVING A MICROPHONE, A LOUDSPEAKER AND A PRINTER

BACKGROUND OF THE INVENTION

This invention relates to a code image recording apparatus adapted to record speech entered through a microphone by printing it on a predetermined printing medium in the form of an optically readable code image and reproducing the entered speech by a speech output means such as a loudspeaker.

The assignee of the present patent application has proposed a recording apparatus for recording speech by printing it on a predetermined printing medium in the form of an optically readable code image of dot codes in EP 0,670,555 A1 (U.S. Ser. No. 08/407,018).

FIGS. 1A and 1B of the accompanying drawings schematically illustrate the configuration of the physical format of dot codes to be used for the proposed recording apparatus. The code pattern 1 comprises a plurality of blocks 2 arranged two-dimensionally on a side by side basis. Each block 2 in turn comprises a data area 3, markers 4 and a block address pattern 5.

The data area 3 contains white dots and black dots representing respective data values of "0s" and "1s" that are assigned to each block as speech data and arranged according to a predetermined format of arrangement to produce a white dot image or a black dot image. The markers 4 are black markers arranged at the four corners of the block 12 to provide a reference point for detecting each dot in the data area 3, each of the markers 4 being formed by a certain number of consecutively arranged black dots. The block address pattern 5 is arranged between adjacently located markers 4 to make the block 2 discriminable from other blocks 2 and contains white dots and black dots representing respective data values of "0s" and "1s" that are assigned to each block as address data including an error detecting or error correcting code. The vertical and horizontal lines connecting the dots in the drawing are used for the ease of understanding and they do not exist in real code images.

A system using dot codes arranged with the above described physical format provides an advantage that the original data can be restored by rearranging the data of the blocks according to their respective addresses if all the dot codes of the data covers an area greater than the area that can be taken by the solid state image sensing device of the image reader or, differently stated, if the entire dot codes of the data cannot be picked up by a single shot, provided that the address of each of the blocks is contained in any of the images taken by the image reader. Therefore, such a dot code system can store a huge volume of data on a single sheet of paper in a manner that can be acheived by no other known one-dimensional or two-dimensional bar code system so that speech data can be transmitted or transported in a simple manner by means of a recording medium such as paper. Thus, the dot code system may have a wide variety of applications that are not conceivable with known code systems.

The code image recording apparatus may be an ordinary printer or a label printer adapted to print and record optically readable dot codes continuously on label-like sheets of paper being fed also continuously along a given direction.

The use of a label printer for a code image recording apparatus is very promising because it is portable and easy to use and hence provides a broad opportunity of utilization.

However, label printers or not, known code image recording apparatuses have problems to be overcome before they get a high market value.

More specifically, when the user inputs speech through the speech input means such as microphone of a code image recording apparatus of the type under consideration, it may be important that the user can recognize the volume of speech he or she can input at a time. Likewise, it may be important the user can recognize the volume of speech that the apparatus can output when the speech input has to be confirmed by reproducing it through the speech output means of the apparatus such as loudspeaker. These and other requirements may be met only by improving certain aspects of the user interface.

BRIEF SUMMARY OF THE INVENTION

In view of the above identified problem, it is therefore the object of the present invention to provide an improved code image recording apparatus of the type under consideration that is adapted to recording a speech entered through a microphone by printing it on a predetermined printing medium in the form of an optically readable code image and reproducing the entered speech by a speech output means such as a loudspeaker, where an improvement is made on the user interface to make the apparatus more friendly to the user.

According to one aspect of the present invention, there is provided a code image recording apparatus comprising:

speech input means for inputting speech;

code image converting means for converting the speech input by the speech input means into a code image of encoded data arranged according to a predetermined format;

a printer for printing the code image converted by the code image converting means on a predetermined printing medium as an optically readable image;

speech output means for outputting the speech input by the speech input means;

operation mode setting means for setting one of: (i) a speech input mode adapted to make the speech enterable through the speech input means in order to have the speech converted into the code image by the code image converting means, and (ii) a speech output mode adapted to make the speech input through the speech input means reproducible through the speech output means; and display means for displaying a volume of speech data receivable and reproducible by the apparatus in the one of the speech input mode and speech output mode set by the operation mode setting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate a presently preferred embodiment of the invention, and together with the general description given above and the detailed description of the preferred embodiment give below, serve to explain the principles of the invention.

DETAILED DESCRIPTION OF THE INVENTION

Now, the present invention will be described by referring to the accompanying drawings that illustrate a preferred embodiment of the invention.

Figure 1A:
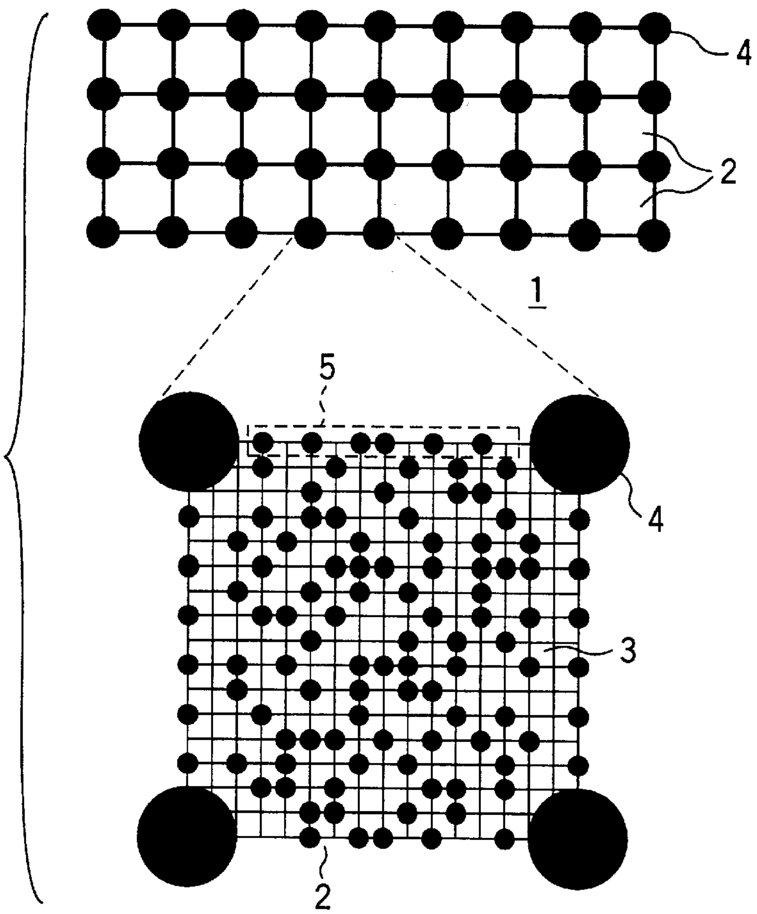
FIG. 1A PRIOR ART
FIG. 1A is a schematic illustration of a physical format of dot codes to be printed on a printing medium for the purpose of the invention.
Figure 1B:
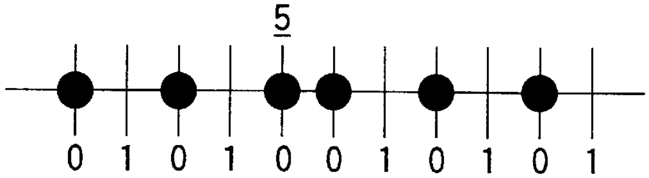
FIG. 1B PRIOR ART
FIG. 1B is a schematic illustration of the block address of the dot code of FIG. 1A.
Figure 2:
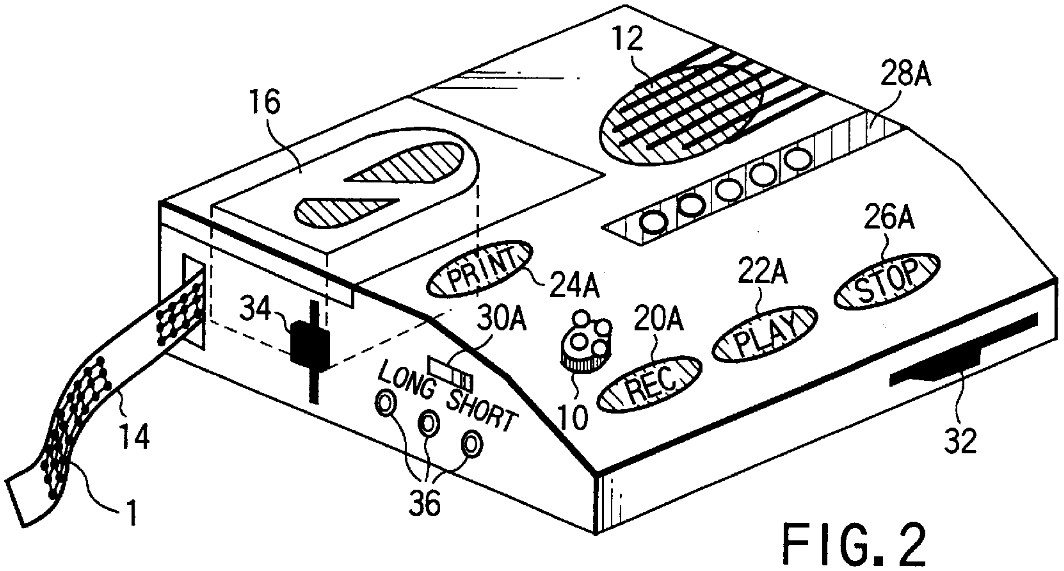
FIG. 2 is a schematic perspective view of an embodiment of code image recording apparatus according to the invention.
Figure 3:
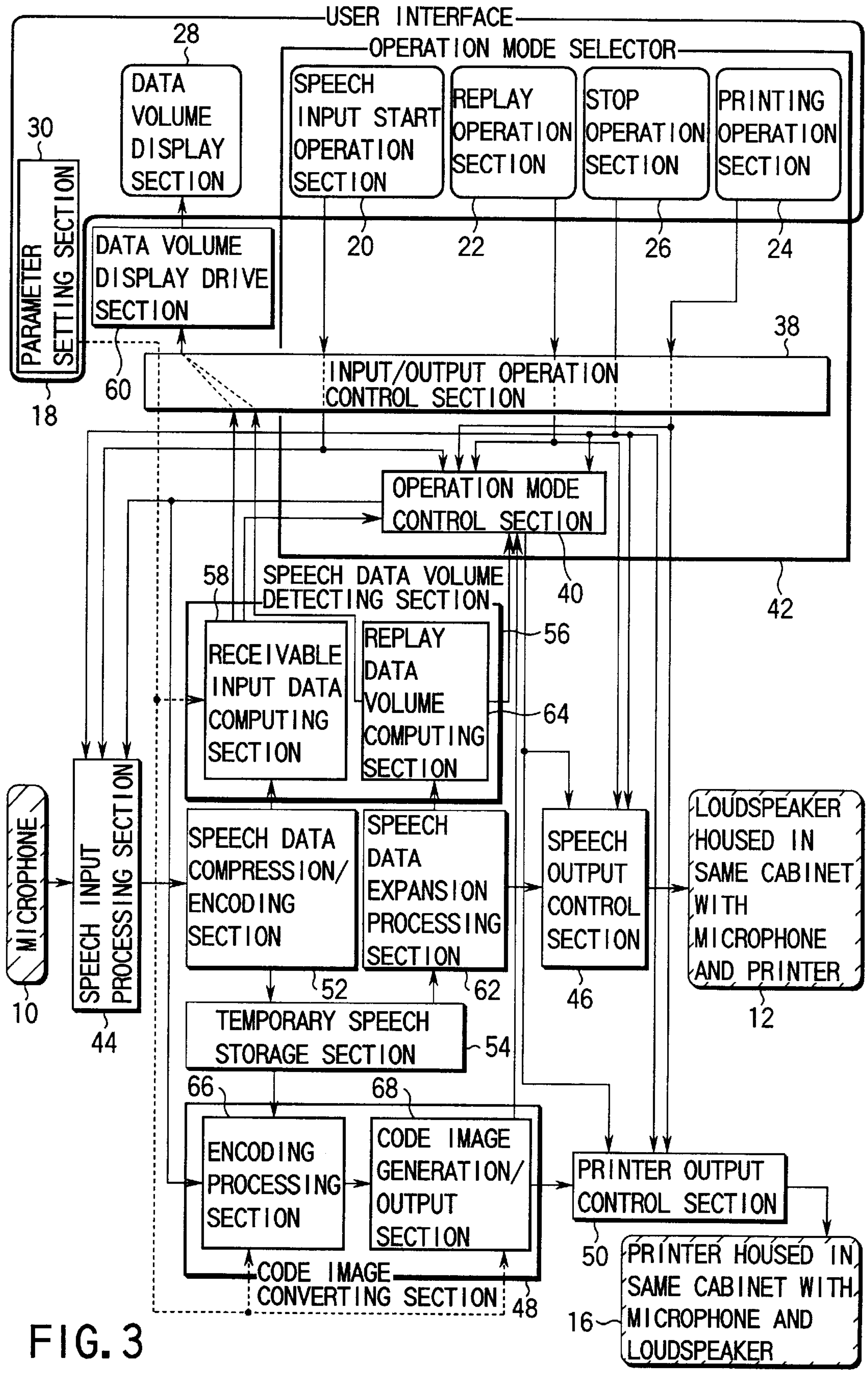
FIG. 3 is a schematic block diagram of the embodiment of code image recording apparatus of FIG. 2.

FIG. 2 is a schematic perspective view of an embodiment of code image recording apparatus according to the invention and FIG. 3 is a schematic block diagram of the embodiment of code image recording apparatus of FIG. 2. The code image recording apparatus comprises a microphone 10 for speech input, a loudspeaker 12 for reproducing the input speech for the purpose of confirmation and a printer 16 for printing a dot code pattern 1 on a label-like printing medium 14, the microphone 10, the loudspeaker 12 and the printer 16 being contained in a single cabinet.

The code image recording apparatus is provided with a speech input start operation section 20, a replay operation section 22, a printing operation section 24, a stop operation section 26, a data volume display section 28 and a parameter setting section 30 arranged on the top and lateral sides of the cabinet.

The speech input start operation section 20 is in fact a "REC" button 20A for starting a speech input operation through the microphone 10 whereas the replay operation section 22 is in fact a "PLAY" button 22A for starting a speech reproducing operation through the loudspeaker 12. The printing operation section 24 and the stop operation section refer respectively to a "PRINT" button 24A for starting an operation of printing a dot code pattern 1 by means of the printer 16 and a "STOP" button 26A for terminating the current operation. The data volume display section 28 is in fact a volume of receivable input/progress of speech reproduction indicator 28A typically comprising five LEDs for indicating the volume of receivable input determined by the preselected total volume of speech input and the volume of input received by microphone 10 and the progress of speech reproduction through the loudspeaker 12.

The parameter setting section 30 includes a long/short mode selector switch 30A for specifying the mode of recording a dot code pattern 1 on a label-like printing medium 14, a total volume of speech input preselecting section and a parameter input section for entering parameters necessary for preparing a dot code pattern 1, although the parameter setting section 30 may alternatively comprise a ROM for storing parameters so that the user may not be required to enter parameters. The long mode and the short mode described above as mode of recording the dot code pattern 1 refer to the respective lengths of the parts to be used when a dot code pattern is divided into a plurality of parts with an interval arranged between any two successive parts so that the dot code pattern may be printed on so many label-like pieces of printing medium 14. For example, the long mode may refer to the use of A4 size (of the A Series Standard used in Japan) sheets of paper arranged vertically and applying label-like sheets of printing medium thereto horizontally, whereas the short mode may refer to the use of blank post cards arranged horizontally (or vertically) and applying label-like sheets of printing medium thereto horizontally.

Reference numeral 32 in FIG. 2 denotes a volume control for controlling the volume with which the input speech is sounded for replaying and reference numeral 34 denotes a cutter lever for operating the built-in cutter to cut and separate the printed label-like sheet of printing medium 14 from the unprinted sheets. Reference numeral 36 denotes a number of jacks to be used for externally inputting/outputting a speech.

The speech input start operation section 20, the replay operation section 22, the printing operation section 24 and the stop operation section 26 operate as part of operation mode selector 42 with an input/output operation control section 38 and an operation mode control section 40. The operation signals from the speech input start operation section 20, the replay operation section 22, the printing operation section 24 and the stop operation section 26 are entered to the operation mode control section 40 by way of the input/output operation control section 38. The operation mode control section 40 controls the operation of each of speech input processing section 44, speech output control section 46, code image converting section 48 and printer output control section 50 according to the present operation mode and the corresponding operation signal it receives.

The speech input control section 44 performs processing operations including amplification, filtering and A/D conversion on the speech signal input through the microphone 10. The speech input processing section 44 is made ready for starting its operation by an operation signal from the speech input start operation section 20 and for stopping its operation by an operation signal from the stop operation section 26, although it does not start its operation until authorized by the operation mode control section 40.

The digital speech data output from the speech input processing section 44 is compressed/encoded for every speech frame unit of 30 msec by a speech data compression/encoding section 52 and stored in a temporary data storage section 54. Speech data volume detecting section 56 has a receivable input data computing section 58 that computes the speech volume that can still be input into the recording apparatus on the basis of the number of frames compressed by the speech data compression/encoding section 52 and the number of frames corresponding to the total speech volume to be input set by the parameter setting section 30 and sends the outcome of the computation to a data volume display drive section 60 by way of the input/output operation control section 38. The data volume display drive section 60 energize the five LEDs of the volume of receivable input/progress of speech reproduction indicator 28A to display the speech volume that can still be received by the recording apparatus.

The speech output control section 46 performs processing operations including amplification, filtering and D/A conversion on the speech data to be reproduced from the loudspeaker 12. The speech output control section 46 is made ready for starting its operation by an operation signal from the replay operation section 22 and stopping its operation by an operation signal from the stop operation section 26, although it does not start its operation until authorized by the operation mode control section 40.

The speech data sent to the speech output control section 46 is a data obtained by expanding the compressed/encoded data stored in the temporary data storage section 54 by means of a speech data expansion processing section 62. At this time, a data indicating the number of frames subjected to the expansion processing operation of the speech data expansion processing section 62 is fed to replay data volume computing section 64 of the speech data volume detecting section 56 from the speech data expansion processing section 62. The replay data volume computing section 64 determines by computation the volume of data reproduced from data stored in the temporary data storage section 54 as will be described in detail hereinafter. The outcome of the computing operation is then fed to the data volume display drive section 60 by way of the input/output operation control section 38 so that the progress of speech reproduction is indicated as the five LEDs of the volume of receivable input/progress of speech reproduction indicator 28A are energized.

The printer output control section 50 controls the printer 16 to print the code image of the dot codes converted by the code image converting section 48. The printer output control section 50 is made ready for starting its operation by an operation signal from the printing operation section 24 and stopping its operation by an operation signal from the stop operation section 26, although it does not start its operation until authorized by the operation mode control section 40.

The code image converting section 48 that feeds the printer output control section 50 with a code image of dot codes comprises an encoding processing section 66 for encoding compressed/encoded speech data stored in the temporary data storage section 54 and a code image generation/output section 68 for converting coded data into a code image and outputting the generated code image. The operation of the encoding processing section 66 is controlled by the operation mode control section 40. Parameters including the compression ratio, the resolution, the number of block rows and the length of the parts obtained by dividing the dot codes necessary for encoding and outputting a code image are set by means of the parameter setting section 30.

The code image generation/output section 68 has a memory (not shown) for storing the generated code image so that a same dot code pattern 1 can be duplicatively reproduced simply by operating the printing operation section 24.

Figure 4:
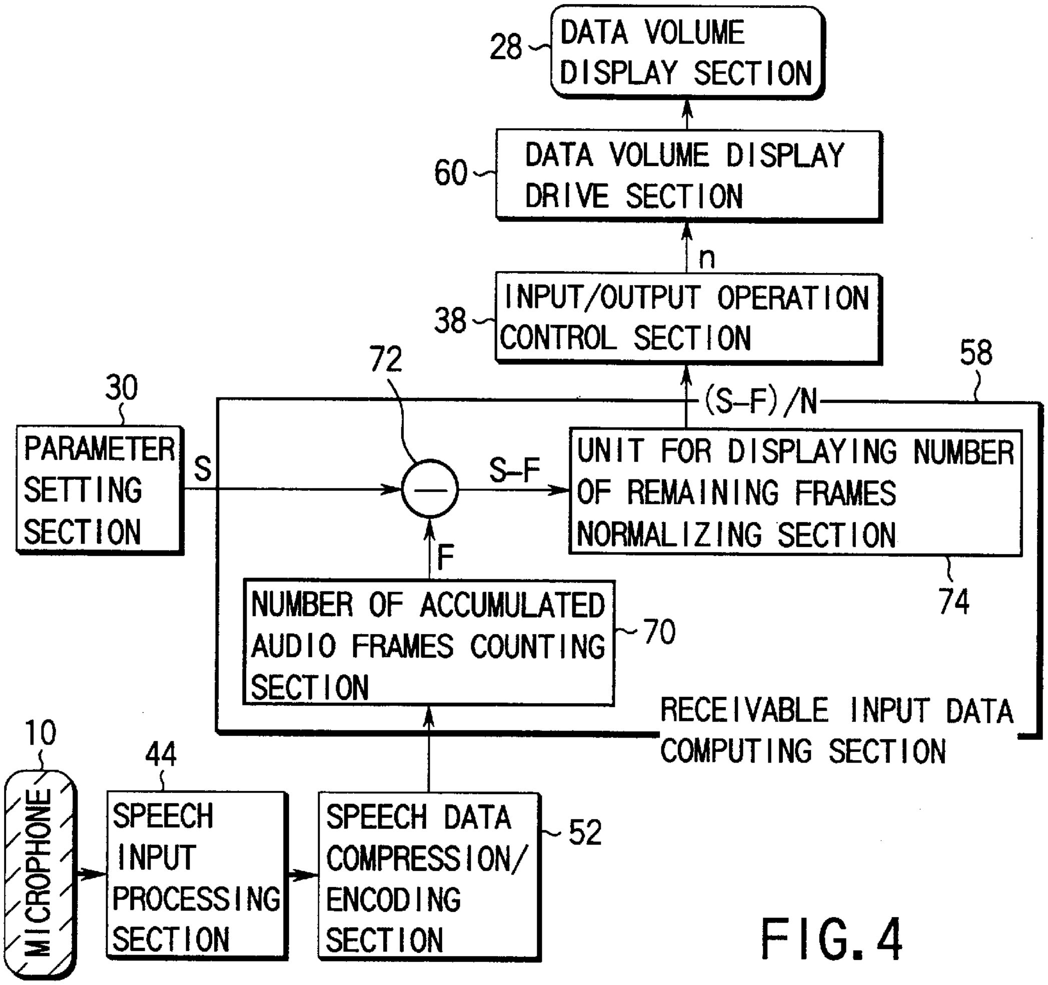
FIG. 4 is a schematic block diagram of the receivable input data computing section.

FIG. 4 is a schematic block diagram of the receivable input data computing section 58. The receivable input data computing section 58 comprises a number of accumulated audio frames counting section 70, a subtraction performing section 72 and a unit for displaying the number of remaining frames normalizing section 74.

Each time the speech data compression/encoding section 52 performs a speech data compressing operation on a frame by frame basis, the number of accumulated audio frames counting section 70 is fed with information on the operation so that it counts the accumulated number of the frames that have been subjected to a compression/encoding operation and notifies the subtraction performing section 72 with the outcome F of its counting operation. The subtraction performing section 72 is fed with the variable number of frames S that corresponds to the volume of receivable data preset by the parameter setting section 30 and performs a subtraction of (S-F) each time it receives the outcome of the counting operation of the number of accumulated audio frames counting section 70 to determine the number of remaining frames. The unit for displaying the number of remaining frames normalizing section 74 normalizes the obtained number of remaining frames to make it conform to the display format of the volume of receivable input/progress of reproduction indicator 28A of the data volume display section 28, which may comprise five LEDs for displaying the number of remaining frames. More specifically, it divides the number of remaining frames by the data volume (number of frames) N per display unit (an LED) and rounds the quotient up or down to an integer. Then, the obtained integer is fed to the data volume display drive section 60 by way of the input/output operation control section 38 to turn on the appropriate ones of the LEDs of the data volume display section 28.

Figure 5:
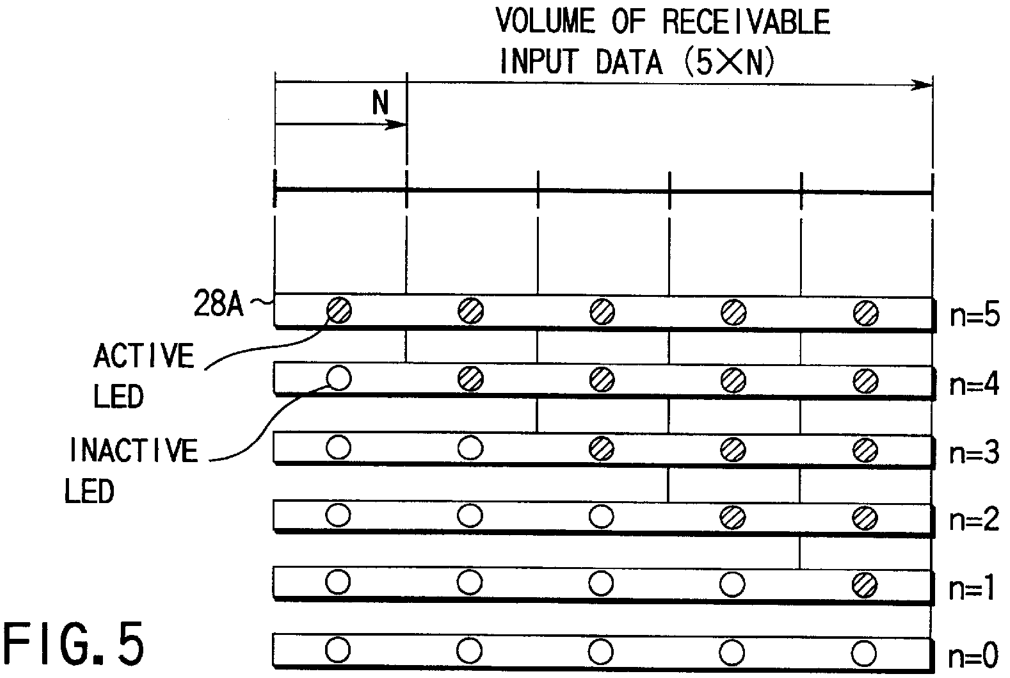
FIG. 5 is a schematic illustration of a possible form of displaying the volume of receivable input data.

FIG. 5 schematically illustrates how the number of turned on LEDs changes with time. When a speech input operation is started, all of the five LEDs are turned on. When data have been input by a volume corresponding to a ⅕ of the receivable data volume of the apparatus, which is represented by a display unit (an LED), the leftmost LED in FIG. 5 is turned off to make the number of turned on LEDs equal to four. Thereafter, the leftmost active LED is turned off each time additional data have been input by a volume corresponding to a ⅕ of the receivable data volume.

Alternatively, the leftmost active LED may be flashed so that the number of remaining frames may be indicated more clearly than by simply activating the corresponding LEDs.

There may arise occasions where the user wants to temporarily suspend (paused) the current speech input operation that has been started by the speech input start section 20. Therefore, it may be so arranged that the user can suspend the operation by operating the speech input start section 20. It may also be so arranged that the user can resume the temporarily suspended operation by operating the speech input start section 20 once again. Alternatively, it may be so arranged that such temporary suspension/resumption of the current speech input operation can be operated not by way of the speech input start section 20 but by way of any of the other operating sections of the operation mode selector that have respective proper functions. Then, the extra function is assigned to the selected section in addition to its proper function.

If such is the case, all of the speech input processing section 44, the speech data compression/encoding section 52 and the receivable input data computing section 58 temporarily suspends their respective operations. The energized LEDs for displaying the receivable volume of data as described above by referring to FIG. 5 keeps on displaying that information regardless of the temporary suspension of operation. If the temporary suspension is released, the LEDs and all of the speech input processing section 44, the speech data compression/encoding section 52 and the receivable input data computing section 58 resumes their respective operations that was taking place immediately before the temporary suspension of operation.

Figure 6:
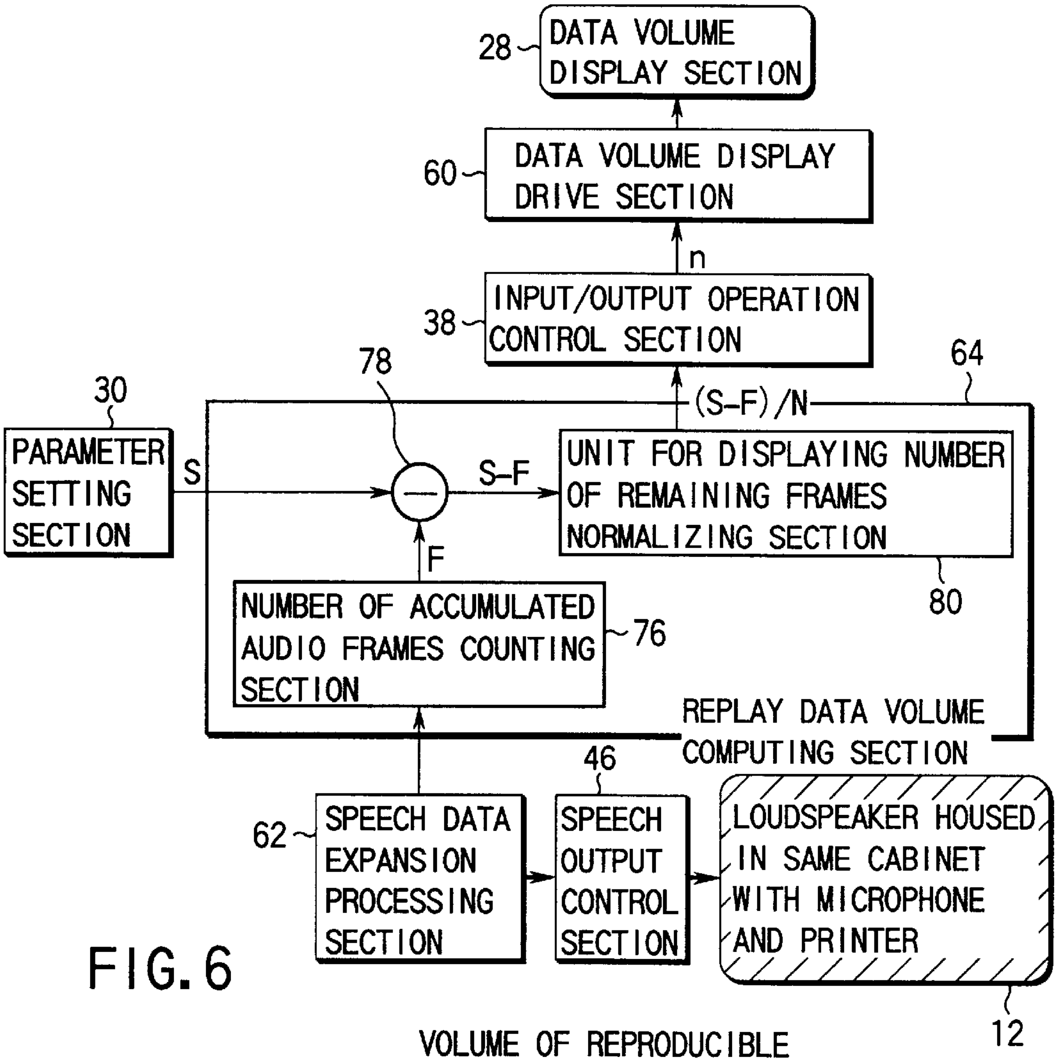
FIG. 6 is a schematic block diagram of the replay data volume computing section.

FIG. 6 is a schematic block diagram of the replay data volume computing section 64. The replay data volume computing section 64 comprises a number of accumulated audio frames counting section 76, a subtraction performing section 78 and a unit for displaying the number of remaining frames normalizing section 80.

Each time the speech data expansion processing section 62 performs a speech data expanding operation on a frame by frame basis, the number of accumulated audio frames counting section 76 is fed with information on the operation so that it counts the accumulated number of the frames that have been subjected to an expanding operation and notifies the subtraction performing section 78 with the outcome F of its counting operation. The subtraction performing section 78 is fed with the variable number of frames S that corresponds to the volume of reproducible data, which is equal to the volume of receivable data that is preset by the parameter setting section 30 and performs a subtraction of (S-F) each time it receives the outcome of the counting operation of the number of accumulated audio frames counting section 76 to determine the number of remaining frames. The unit for displaying the number of remaining frames normalizing section 80 normalizes the obtained number of remaining frames to make it conform to the display format of the volume of receivable input/progress of reproduction indicator 28A of the data volume display section 28. More specifically, it divides the number of remaining frames by the data volume (number of frames) N per display unit (an LED) and rounds the quotient up or down to an integer. Then, the obtained integer is fed to the data volume display drive section 60 by way of the input/output operation control section 38,to turn on the appropriate ones of the LEDs of the data volume display section 28.

Figure 7:
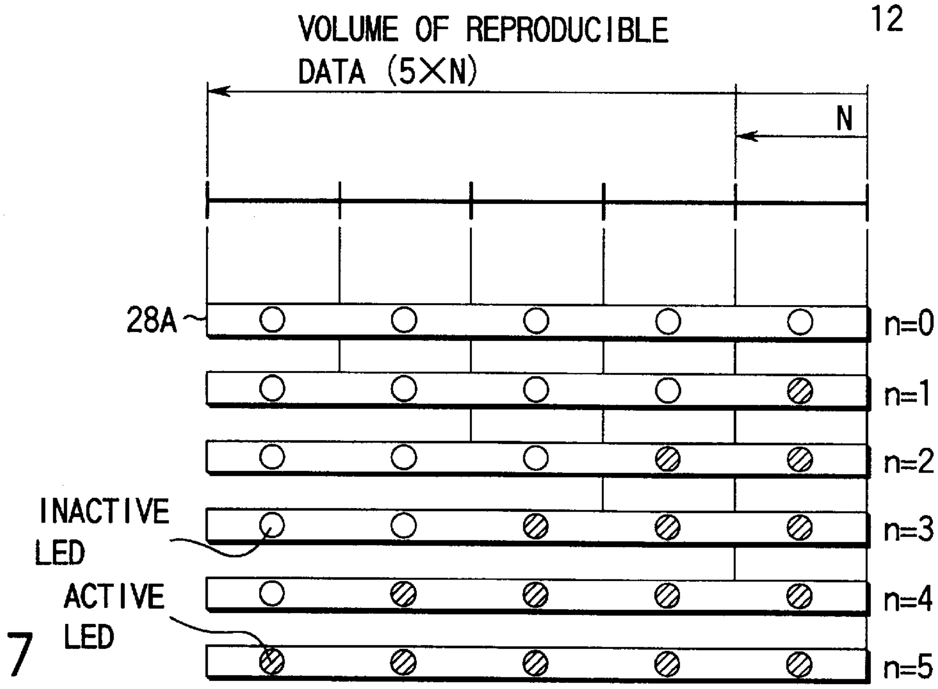
FIG. 7 is a schematic illustration of a possible form of displaying the progress of reproduction.

FIG. 7 schematically illustrates how the number of turned on LEDs changes with time. Contrary to a speech input operation, all of the five LEDs are turned off when a replay output operation is started. When data have been reproduced (i.e., speech data have been expanded) by a volume corresponding to a ⅕ of the receivable data volume of the apparatus, which is represented by a display unit (an LED), the rightmost LED in FIG. 7 is turned. Thereafter, the rightmost inactive LED is turned on each time additional data have been input by a volume corresponding to a ⅕ of the receivable data volume.

Alternatively, in this case again, the leftmost active LED may be flashed so that the number of remaining frames may be indicated more clearly than by simply activating the corresponding LEDs.

There may arise occasions where the user wants to temporarily suspend the current speech replay operation that has been started by the replay operation section 22. Therefore, it may be so arranged that the user can suspend the operation by operating the replay operation section 22. It may also be so arranged that the user can resume the temporarily suspended operation by operating the replay operation section 22 once again. Alternatively, it may be so arranged that such temporary suspension/resumption of the current speech replay operation can be operated not by way of the replay operation section 22 but by way of any of the other operating sections of the operation mode selector that have respective proper functions. Then, the extra function is assigned to the selected section in addition to its proper function.

If such is the case, all of the speech data expansion processing section 62, the replay data volume computing section 64 and the speech output control section 46 temporarily suspends their respective operations. The energized LEDs for displaying the progress of reproduction as described above by referring to FIG. 7 keeps on displaying that information regardless of the temporary suspension of operation. If the temporary suspension is released, the LEDs and all of the speech data expansion processing section 62, the replay data volume computing section 64 and the speech output control section 46 resumes their respective operations that was taking place immediately before the temporary suspension of operation.

While the number of active LEDs shows a linear relationship with the data volume that are still receivable or reproducible by the apparatus, an LED representing a ⅕ of the total receivable or reproducible data volume, in the above description, it may alternatively be so arranged that the number of active LEDs shows a nonlinear relationship with the data volume that are still receivable or reproducible by the apparatus, the leftmost LED representing a ½ of the total receivable data volume, the next LED representing a ¼ of the total receivable data volume and so on.

Still alternatively, it may be so arranged that the LEDs are used to display the time waiting for an encoding operation of the code image converting section 48 in stead of displaying the progress of a reproducing operation if the user does not drive the replay operation section 22 after inputting a speech.

As described above, the user who is inputting or reproducing a speech can receive a time-related support by the apparatus that is adapted to display information indicating the volume of speech data that the apparatus can still receive or still reproduce, whichever appropriate. With this support feature, the user can input and/or reproduce speech data with ease in a desired way to prevent an unconsummated speech input and/or speech replay operation from occurring and can comfortably carry out a speech input and/or speech replay operation in a desired manner.

While the present invention is described above by referring to a preferred embodiment, the present invention is not limited thereto and the above embodiment can be altered or modified in many different ways without departing from the scope of the invention.

The present invention may be summarized as follows.

(1) A code image recording apparatus comprising:

speech input means for inputting speech;

code image converting means for converting the speech input by the speech input means into a code image of encoded data arranged according to a predetermined format;

a printer for printing the code image converted by the code image converting means on a predetermined printing medium as an optically readable image;

speech output means for outputting the speech input by the speech input means;

operation mode setting one of: (i) means for setting a speech input mode adapted to make the speech enterable through the speech input means in order to have the speech converted into the code image by the code image converting means, and (ii) a speech output mode adapted to make the speech input through the speech input means reproducible through the speech output means; and display means for displaying a volume of speech data receivable and reproducible by the apparatus in the one of the speech input mode and speech output mode set by the operation mode setting means.

With the above arrangement, the user who is inputting or reproducing a speech can receive a time-related support by the apparatus that is adapted to display information indicating the volume of speech data that the apparatus can still receive or still reproduce, whichever appropriate. With this support feature, the user can input and/or reproduce speech data with ease in a desired way to prevent an unconsummated speech input and/or speech replay operation from occurring and can comfortably carry out a speech input and/or speech replay operation in a desired manner.

(2) An apparatus according to (1), wherein the display means displays:

the volume of speech data receivable by the apparatus as a function of a volume of the input speech data that is changeable with time in the speech input mode if the speech input mode is set by the operation mode setting means; and the volume of speech data reproducible by the apparatus as a function of a volume of the output speech data that is changeable with time in the speech output mode if the speech output mode is set by the operation mode setting means.

With the above arrangement, the volume of the input or output speech data accurately reflecting the actual data input or output time, whichever appropriate, is displayed for the convenience of the user who may want to know the time elapsed for and the current status of the ongoing input or output operation to eliminate any misconception on the part of the user.

(3) An apparatus according to (2), wherein the display means displays:

the volume of speech data receivable by the apparatus as a linear function of the volume of the input speech data that is changeable with time; and the volume of speech data reproducible by the apparatus as a linear function of the volume of the output speech data that is changeable with time, the linear functions being an inverse function relative to each other.

The above arrangement of displaying the volume of speech data receivable by the apparatus as a linear function of the volume of the input speech data and the volume of speech data reproducible by the apparatus as a linear function of the volume of the output speech data may provide a particularly convenient display system that can be easily recognized by the user because the linear functions are inverse relative to each other. With such a display system, the time elapsed for and the current status of the ongoing input or output operation to eliminate any misconception on the part of the user.

(4) An apparatus according to (2) or (3), further comprising:

input data volume setting means for setting the volume of data receivable by the apparatus in the speech input mode; and wherein the display means is adapted to modify the display of the volume of receivable speech data as a function of the volume of receivable data set by the input data volume setting means.

With the above arrangement, the time usable for a speech input or the enterable data volume can be modified to regulate the maximum time usable for the speech input to allow a flexible speech input operation. Additionally, the displayed volume of speech data receivable by the apparatus that is changeable with time is important from the viewpoint of intentionally regulating the volume of input data within the maximum volume of enterable data but not from the viewpoint of displaying the absolute volume of input speech data. Therefore, as the display of the volume of receivable speech data can be modified as a function of the maximum volume of receivable data with the above arrangement, the current status of the ongoing input operation can be normalized by means of the maximum volume of receivable data to become easily recognizable.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code image recording apparatus comprising;

speech input means for inputting speech;

code image converting means for converting the speech input by said speech input means into a code image of encoded data arranged according to a predetermined format;

a printer for printing the code image converted by said code image converting means on a predetermined printing medium as an optically readable image;

speech output means for outputting the speech input by said speech input means;

operation mode setting means for setting one of: (i) a speech input mode adapted to make the speech enterable through said speech input means in order to have the speech converted into the code image by said code image converting means, and (ii) a speech output mode adapted to make the speech input through said speech input means reproducible through said speech output means; and display means for displaying a volume of speech data receivable and reproducible by the apparatus in the one of the speech input mode and speech output mode set by said operation mode setting means.

2. An apparatus according to claim 1, wherein said display means displays:

the volume of speech data receivable by the apparatus as a function of a volume of the input speech data that is changeable with time in the speech input mode if the speech input mode is set by said operation mode setting means; and the volume of speech data reproducible by the apparatus as a function of a volume of the output speech data that is changeable with time in the speech output mode if the speech output mode is set by said operation mode setting means.

3. An apparatus according to claim 2, further comprising:

input data volume setting means for setting the volume of data receivable by the apparatus in the speech input mode; and wherein said display means is adapted to modify the display of the volume of receivable speech data as a function of the volume of receivable data set by said input data volume setting means.

4. An apparatus according to claim 2, wherein said display means displays:

the volume of speech data receivable by the apparatus as a linear function of the volume of the input speech data that is changeable with time; and the volume of speech data reproducible by the apparatus as a linear function of the volume of the output speech data that is changeable with time, the linear functions being an inverse function relative to each other.

5. An apparatus according to claim 4, further comprising:

input data volume setting means for setting the volume of data receivable by the apparatus in the speech input mode; and wherein said display means is adapted to modify the display of the volume of receivable speech data as a function of the volume of receivable data set by said input data volume setting means.

* * * * *